United States Patent [19]
Gilbert

[11] Patent Number: 5,209,001
[45] Date of Patent: May 11, 1993

[54] TRENCHING MACHINE WITH LONGITUDINALLY STABILIZED MAIN FRAME FOR STABILIZING DIGGING IMPLEMENT

[76] Inventor: Jerry F. Gilbert, 3545 E. Main St., Grand Prairie, Tex. 75050

[21] Appl. No.: 869,349

[22] Filed: Apr. 14, 1992

[51] Int. Cl.⁵ .............................................. E02F 5/06
[52] U.S. Cl. ...................................... 37/87; 37/80 R; 37/191 A
[58] Field of Search .............. 37/86, 80 R, 87, 191 R, 37/191 A, DIG. 3, DIG. 20, 235

[56] References Cited
U.S. PATENT DOCUMENTS

| | | | |
|---|---|---|---|
| 1,477,940 | 12/1923 | Brown | 37/87 X |
| 2,946,142 | 7/1960 | Swanson | 37/80 R |
| 4,833,797 | 5/1989 | Slunecka et al. | 37/86 |
| 4,848,012 | 7/1989 | Zimmerman | 37/DIG. 3 X |
| 4,890,399 | 1/1990 | Stiff et al. | 37/86 |
| 4,905,387 | 3/1990 | Street | 37/235 X |
| 4,910,891 | 3/1990 | Martin et al. | 37/DIG. 12 X |

Primary Examiner—Dennis L. Taylor
Assistant Examiner—J. Russell McBee
Attorney, Agent, or Firm—Marcus L. Bates

[57] ABSTRACT

An excavating machine has a track mounted main frame with a digging implement mounted to one end of the main frame for vertical adjustment in the usual manner. A stabilizer apparatus is pivotally mounted to the other end of the main frame. The stabilizer apparatus has a wheel that is forced against the ground to tilt the main frame longitudinally about the support track in order to dampen oscillations induced into the machine by the digging implement and to force the digging implement to engage the ground with a constant force which enables the excavating machine to excavate material in an improved manner.

20 Claims, 4 Drawing Sheets

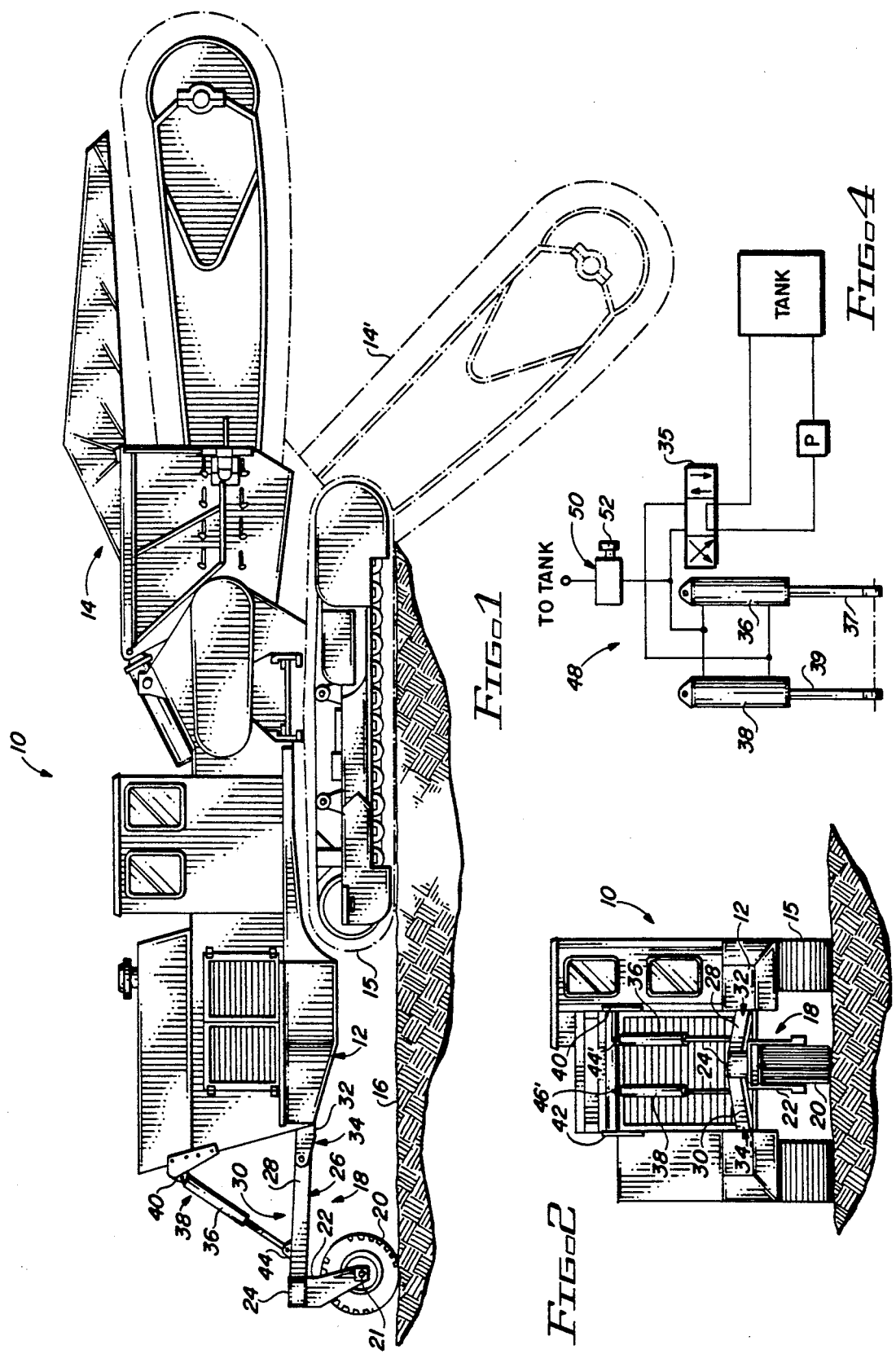

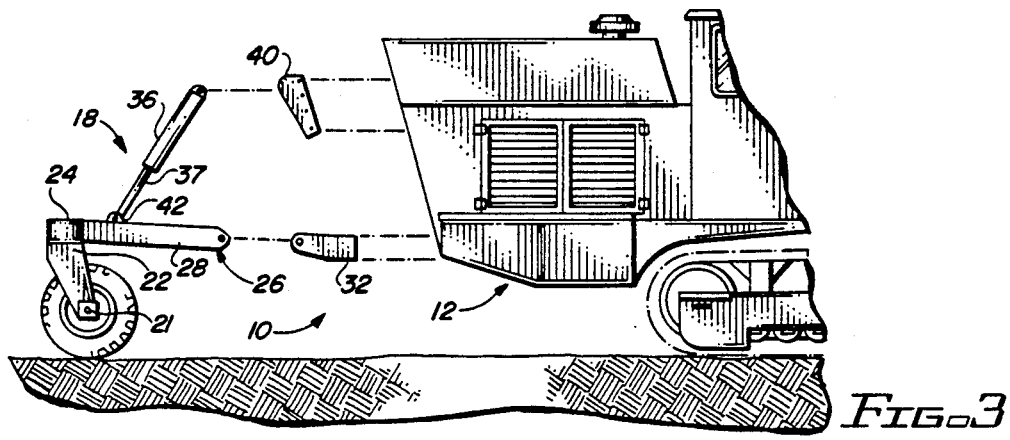
FIG. 3
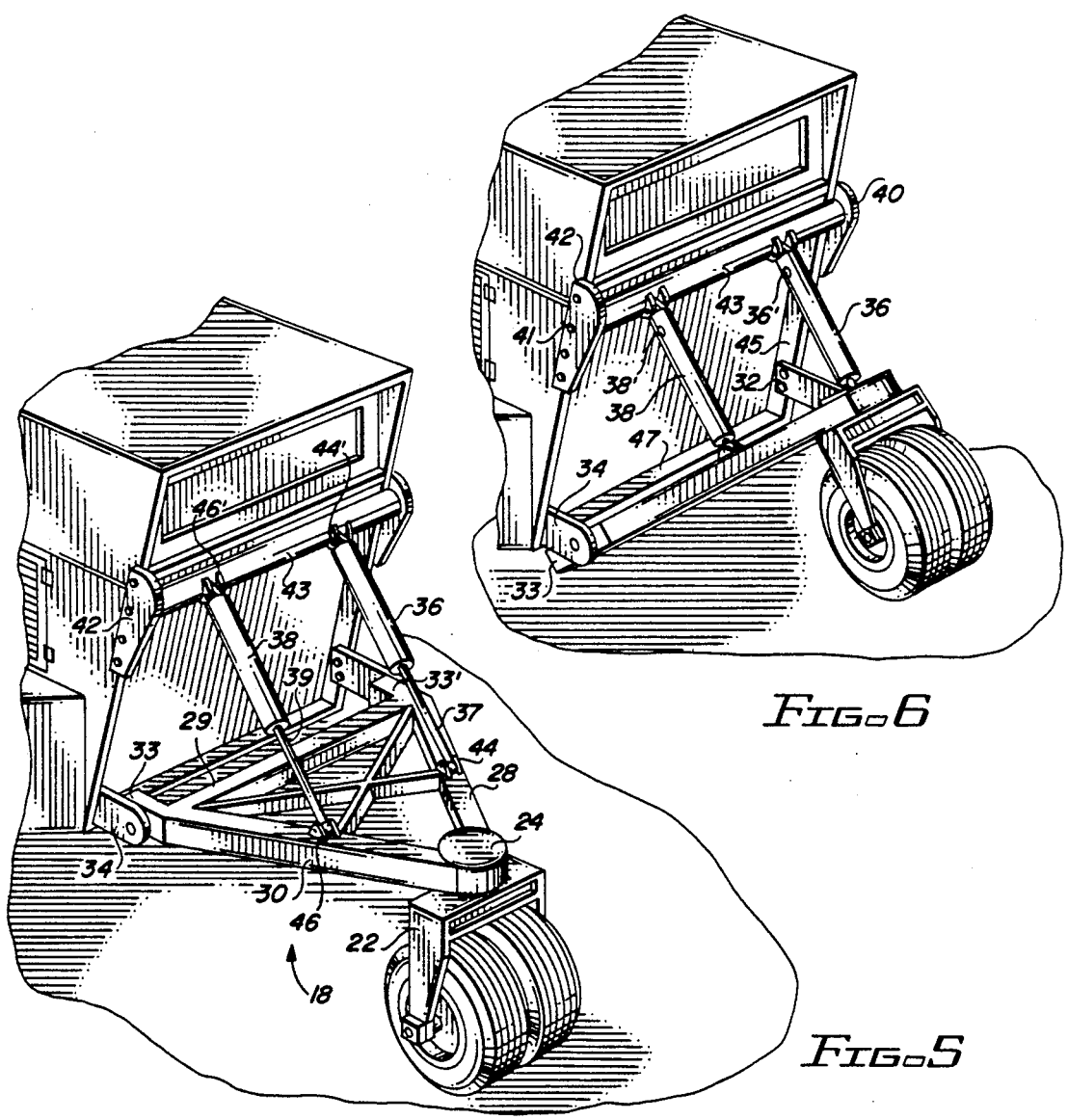
FIG. 6
FIG. 5

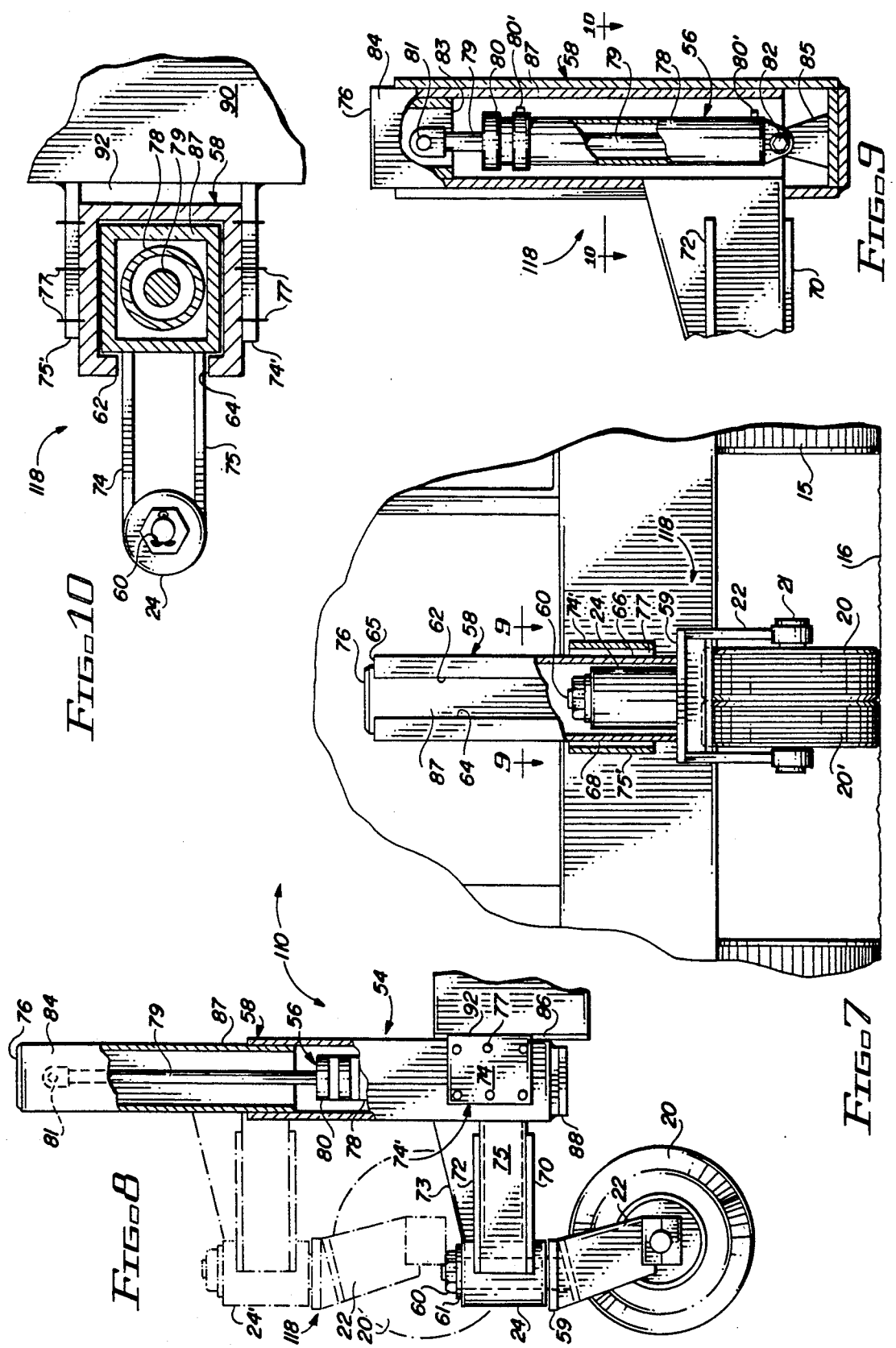

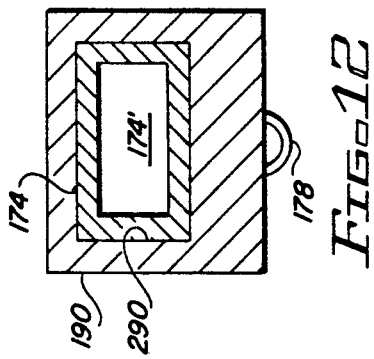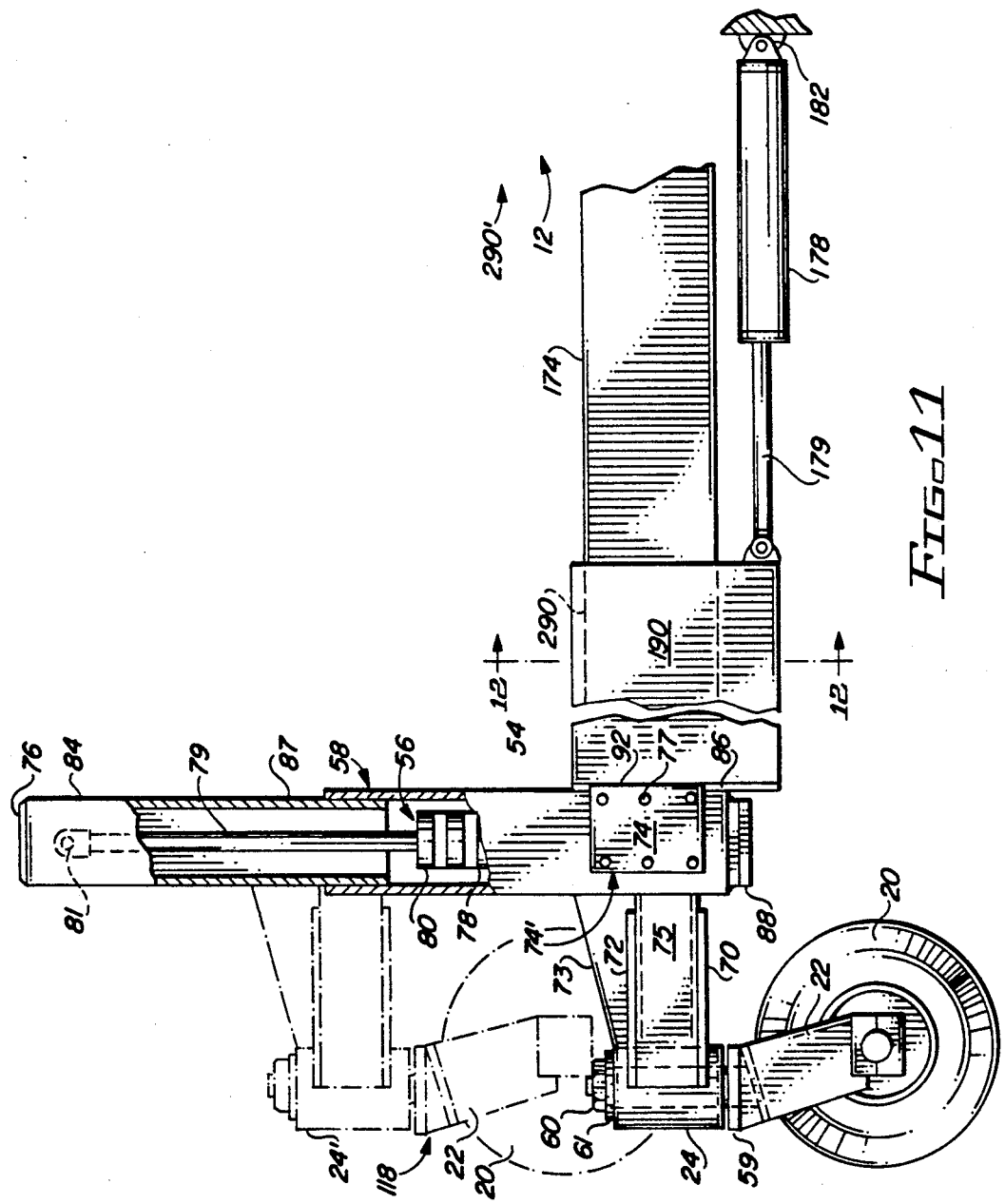

TRENCHING MACHINE WITH LONGITUDINALLY STABILIZED MAIN FRAME FOR STABILIZING DIGGING IMPLEMENT

BACKGROUND OF THE INVENTION

Many excavating machines, especially those of the type having a track mounted main frame, often are forced to proceed at a reduced penetration rate because the digging implement engages the ground in a manner that induces a fore and aft rocking motion into the main frame. This rocking motion imposes undesirable forces that break the digging teeth and cause other damage to the digging implement as it repeatedly oscillates with a pitching movement that slams it into the ground each oscillation. This uncontrollable impacting of the digging implement against the ground can damage the machine and result in costly repairs.

In the past, such longitudinal oscillatory motion has been partially overcome by reducing the power output to the digging implement, and by adding weight to the end of the main frame that is opposed to the digging implement. While both of these solutions together enable the excavating job to proceed at a moderate rate, they nevertheless are objectionable because the weight distribution of the machine is different from the intended design, and the machine cannot proceed with the maximum digging efficiency and accuracy for which it was designed.

Therefore, it is desirable to have made available an excavating machine having a digging implement thereon that is stabilized against longitudinal rocking movement and thereby can proceed digging at the maximum designed digging rate. It is further desired that the apparatus by which the excavating machine is stabilized against rocking movement have the capability of being retro-fitted to other similar excavating machines.

Accordingly, this disclosure comprehends a trenching or excavating machine having a stabilizing apparatus mounted on the main frame thereof in opposition to the digging implement that positions the digging implement of the trenching machine uniformly against the strata to be removed to thereby excavate in an improved manner.

SUMMARY OF THE INVENTION

This invention comprehends an excavating machine having a digging implement and a stabilizer therefor supported thereon. The stabilizer apparatus is mounted to one end of a main frame, and the digging implement is mounted to the other end of the main frame in a manner such that an excavation can be formed longitudinally of the machine.

More specifically, this disclosure comprehends a digging machine having a ground supported main frame. One end of the main frame supports an elongated chain-type digging implement, for example, and a stabilizer apparatus is mounted on the opposite end of the main frame. The stabilizer apparatus can be moved vertically respective to the main frame to engage the ground and thereby force the end of the main frame upward while the digging implement is forced in a downward direction to engage the ground with a constant force, to thereby avoid impacting against the earth whereby the digging machine excavates in an improved manner.

Still more specifically, this disclosure comprehends a digging machine having a track mounted to support a main frame. One end of the main frame supports a digging implement and the other end supports a stabilizer apparatus. The stabilizer apparatus, according to this invention, is movably mounted for vertical adjustment respective to the main frame, and includes a ground engaging wheel assembly that is mounted for castering in any direction while in rolling contact with the ground. The stabilizer apparatus is positioned to move vertically into contact with the ground in order to force the end of the main frame upwards and consequently force the digging implement at the opposite end of the main frame into engagement with the ground with a controlled force that enables the excavation operation to be carried out in an improved manner.

In one specific embodiment of the invention, the stabilizer apparatus is positioned on one end of the main frame opposite to a digging implement at the opposed end thereof. The stabilizer apparatus includes a pivotal frame assembly that has one end thereof hinged to the one end of the main frame, with the other end of the pivotal frame having a ground engaging wheel assembly supported thereon that is mounted for castering in any direction. Hydraulically actuated cylinders are attached between the pivotal frame assembly and the one end of the main frame and pivots the wheel assembly into contact with the ground with a selected constant force that is proportional to the hydraulic pressure effected within the hydraulic cylinders.

In another specific embodiment of the invention, the stabilizer apparatus is positioned on the end of a main frame opposite to a digging implement thereof and includes a telescoping elevator having a fixed support column within which there is guidably received a vertically movable member. The vertically movable member has one end thereof captured in a telescoping and reciprocating manner respective to the fixed member for vertical movement respective to the main frame. The vertically movable member has a wheel assembly supported thereon. The wheel assembly is mounted for castering in any direction while making rolling contact with the ground. A hydraulically actuated cylinder is enclosed within the elevator and is attached between the fixed and movable members to allow the wheel attached thereto to contact the ground with a selected constant force that is proportional to the hydraulic pressure effected within the hydraulic cylinder.

In still another specific embodiment of the invention, one of the foregoing stabilizer apparatus is positioned on the end of a counterweight support, with the other end of the counterweight support being attached to the main frame opposite to a digging implement thereof; and includes a telescoping counterweight guidably received thereon. A hydraulically actuated cylinder is attached between the main frame and the counterweight to allow the counterweight to be selectively positioned to change the center of gravity such that the wheel attached to the stabilizer apparatus contacts the ground with a selected constant force.

Therefore, a primary object of this invention is to disclose and provide a stabilizing apparatus for reducing pitching motion in an excavating machine.

A further object of the present invention is to provide an excavating machine having a digging implement attached to one end of a main frame thereof with a stabilizing apparatus attached to the opposed end of the main frame to form an excavation longitudinally of the machine with accuracy and at an efficient digging rate.

A still further object of the present invention is the provision of a stabilizing apparatus that is attached to an end of a main frame of an earth moving vehicle to stabilize a digging implement attached to the opposite end thereof.

Another object of the present invention is to provide an improved vehicle of the excavating type having a ladder type trenching apparatus and a stabilizing apparatus mounted to the opposite ends of a main frame thereof, and wherein the stabilizing apparatus contacts the ground to lift the stabilizer end thereof which forces the digging implement into engagement with the ground and thereby enhances the digging action of the trenching apparatus.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described herein.

BRIEF DESCRIPTION OF THE DRAWINGS

FIG. 1 is a side elevational view of the preferred embodiment of a stabilized excavating machine made in accordance with this invention, shown in operation while excavating a ditch;

FIG. 2 is a front end view of the excavating machine disclosed in FIG. 1;

FIG. 3 is a broken, partly dissembled, side view of the excavating machine disclosed in FIGS. 1 and 2;

FIG. 4 is a schematical representation of a hydraulic system that advantageously can be used in conjunction with the excavating machine disclosed in the figures of the drawings;

FIGS. 5 and 6 are enlarged, fragmentary, detailed, front perspective views of part of the excavating machine disclosed in FIGS. 1-3 and showing the apparatus of the invention in alternate positions of operation;

FIG. 7 is a partial, detailed, front end view of the forward part of an alternate embodiment of the excavating machine disclosed in the foregoing Figures, with some parts removed therefrom and some of the remaining parts shown in cross-section;

FIG. 8 is a side view of the front end of the excavating machine disclosed in FIG. 7, with the apparatus shown in dot-dash in the retracted configuration;

FIG. 9 is a broken, part cross-sectional, side view of part of the apparatus disclosed in FIGS. 7 and 8, and shown in an alternate position of operation respective to FIG. 8;

FIG. 10 is a fragmentary, part cross-sectional view taken along line 10—10 of FIG. 9;

FIG. 11 is a broken, part cross-sectional, side view of another embodiment of the invention; and, FIG. 12 is a fragmentary, part cross-sectional view taken along line 12—12 of FIG. 11.

DETAILED DESCRIPTION OF THE PREFERRED EMBODIMENT

As illustrated in the figures of the drawings, a ground supported excavating machine 10 has a main frame 12 to which there is attached a digging implement 14 at one end thereof for digging into and excavating material from the ground. A stabilizing apparatus 18, made in accordance with this invention, is attached at the opposed end thereof. The main frame 12 is supported from spaced apart parallel tracks 15. The stabilizer apparatus 18 has a wheel 20 rotatably received by the axle 21. The axle is attached to the lower end of yoke 22. The yoke 22 is rotatably received by a knuckle 24 for rotation about a vertical axis thereof, thereby enabling the wheel 20 and yoke 22 to freely caster in all directions.

In FIGS. 1, 2, 3, 5 and 6, the knuckle forms part of an elevator apparatus 26. The elevator apparatus 26 has a pivotal frame comprised of arm members 28 and 30 that are pivotally connected adjacent the divergent ends thereof to a pair of spaced mount lugs 32 and 34. The spaced mount lugs 32 and 34 are affixed to the main frame 12. Hydraulically actuated cylinder assemblies 36 and 38 are supported from the spaced upper mount lugs 40 and 42 and arm members 28 and 30. Spaced lower hinge members 44 and 46 receive the clevis attached to the free end of piston 37 and 39 for pivoting the arm members 28 and 30 of the stabilizer apparatus.

In the flow diagram of FIG. 4, hydraulic circuitry 48 is associated with the before mentioned hydraulically actuated cylinders assemblies 36 and 38. The apparatus of FIG. 4 includes a hydraulic switching valve 35 that controls the flow of hydraulic fluid from pump P into the appropriate end of the cylinder assemblies 36 and 38, and the return therefrom into the illustrated tank. Regulator or pressure control device 50 has pressure selector or regulator 52 by which the pressure effected by pump P on the hydraulic cylinder assemblies 36 and 38 is selected and thereby provides a constant selected pressure on the hydraulic cylinder assemblies 36 and 38. This places a constant predetermined pressure on the wheel 20.

In FIG. 3, the stabilizer apparatus 18 is shown removed from the main frame 12. In FIG. 5 and 6, the lower mount lug 32 and upper mount lug 40 and 42 are attached to a fixed mounting frame 45 and 47 which is secured to the forward terminal end of main frame 12 by any suitable means, as for example, bolting, as suggested by the numeral 41. The fixed mounting frame can be retro-fitted to a number of prior art excavating machines 10 that take on any number of different forms.

In FIGS. 5 and 6, the arm members 28 and 30 are seen to converge toward knuckle 24, and to diverge into horizontally spaced members 33 and 33', with spreader bar 29 being fixed therebetween, while leaving rearwardly extending ears that are journaled to the spaced lower mounting lugs 32 and 34 for pivotal movement of the arm members 28 and 30 and wheel 20. The upper mounting lugs 40 and 42 have a spreader bar 43 affixed therebetween, with cylinder hanger hinge members 44' and 46' being attached thereon for accommodating the pivotal pin end of the hydraulic cylinder assemblies 36 and 38.

Throughout this disclosure, wherever it is practical or logical to do so, like or similar numerals will refer to like or similar elements. In the second embodiment of the invention set forth in FIGS. 7-10, there is illustrated a stabilizing apparatus 118 at the opposed end of the main frame 12 of an excavating machine 110. The wheel 20 is affixed to the yoke 22 which in turn is journaled to knuckle 24 as in the before described manner of the first embodiment.

In FIGS. 7-10, an elevator 54 raises the wheel 20, yoke 22 and knuckle 24 in response to hydraulic pressure effected on the lifting cylinder assembly 56 thereof. The lifting cylinder assembly is housed within fixed support column 58.

The yoke 22 has a flat 59 that slidably abuts the knuckle 24. The yoke 22 is affixed to an upstanding shaft that is rotatably received through the knuckle 24 for swiveling or rotating about a vertical axis in any direction. The yoke shaft terminates in a threaded shaft end that receives fastener 60 and washer 61 thereon.

The knuckle 24 forms part of the elevator 54 and moves vertically along with yoke 22 and wheel 20. The fixed support column 58 preferably in the form of a quadrahedron, and preferably is square in cross-sectional configuration, as shown in FIG. 10. As best seen illustrated in FIGS. 8 and 10, the support column 58 includes a vertical window formed therein that is defined by parallel edge portions 62 and 64. The window opens toward the yoke 22 and renders the upper marginal length of the square support housing discontinuous. The window extends downwardly from upper edge 65. The support column 58 includes opposed sidewalls 66 and 68 attached to a rear wall. Horizontal plate members 70 and 72 are spaced apart by opposed attachment members 74 and 75 which are affixed to the vertical plate member 73. Plate attachment members 74 and 75 are spaced apart by the knuckle at one end thereof and the other ends thereof are attached to the sidewall of telescoping lift member 87. Plate attachment members 74 and 75 are slidably received for vertical movement within the window and between window edges 62 and 64 which form a guide therefor. Plate attachment members 74' and 75' attach the support column 58 to the counterweight 90. In the absence of a counterweight, the support column 58 is attached directly to the main frame by means of plate attachment members 74' and 75', or alternatively, in the manner of FIG. 1 of the drawings. Numeral 76 indicates the upper terminal end of the telescoping lifting member 87 of the elevator apparatus.

Bolts 77 removably affix the support column 58 to the spaced plate attachment members 74' and 75'. Hydraulic lift cylinder 78 has a piston shaft 79 extending from the upper end 80 thereof. The upper terminal end of the shaft 79 has a clevis 81 that is opposed to a clevis 82 at the lower end of lift cylinder 78, with the opposed ends of the cylinder assembly being pinned at clevis 81 to traveling head 84 and at clevis 82 to the internal lug 85. Lower end 83 of traveling head 84 is hollow as seen in FIG. 9 for accommodating clevis 81. Lower end 86 of the fixed support column 58 is a provided with closure member Telescoping lift member 87 is made complementary respective to the support column 58 and is slidably received in close tolerance relationship within the support column 58. The lower end of fixed column 58 has a closure member 88 affixed thereto. Counter weight 90 is attached to the forward end of the excavating machine to compensate for the weight of the digging implement 14. Space 92 between counterweight 90 and elevator 54 is not critical.

FIGS. 11 and 12 disclose another embodiment of the present invention wherein the stabilizer assembly is attached to a sliding counter-weight located on the main frame of the trencher. The counter-weight 190 has plate member 74 extending forwardly therefrom for attachment to the stabilizer assembly. Counter-weight cylinder 178 has a piston rod 179 extending therefrom and pinned to the illustrated lug located on counter-weight 190. The opposed end 182 of cylinder 178 is attached to the main frame 12.

Alternatively, the counter-weight 190 can be fixed to counter-weight support 174 and the counter-weight support 174 telescoped into the main frame 12 by the action of counter-weight cylinder 178.

As seen in FIGS. 11 and 12, the counter-weight has a tunnel 290 that telescopingly receives the counter-weight support 174 therewithin in a slidable manner to thereby position counter-weight 190 between the stabilizer assembly and the main frame.

Attaching the stabilizer assembly to the front of the excavating machine does not hinder the normal operation of the counter-weight and it also allows the stabilizer assembly to be extended with the counter-weight and thereby allows the stabilizer to work effectively at lower pressures because it is positioned further from the center of gravity of the machine.

The stabilizer apparatus 118 can be retro-fitted to the front end of numerous ground supported excavating machines 10 by attaching the stabilizer apparatus 18 or 118 to the forward terminal end of main frame 12 by any suitable means, as for example, bolting or welding. This enables the stabilizer apparatus 118 seen in FIG. 3, for example, to be attached and removed from the main frame 12, by removing the hydraulic fluid connectors at 80' along with the bolts at 77.

The fluid circuitry of FIG. 4 advantageously can be employed in conjunction with the embodiment of FIGS. 7-10 by connecting the switching valve 35 and regulator or pressure control device 50 to provide pressure from pump P to connectors 36', 38' and 80, and thereby maintain a constant predetermined pressure of the wheel 20 against the ground 16; which in turn enables the digging implement 14 to be forced against the ground 16 with a constant predetermined pressure during the excavation process.

The stabilizer apparatus 18 is retro-fitted to the front end of a ground supported excavating machine 10 by attaching to the main frame 12 the lower mount lugs 32 and 34 and upper mount lugs 40 and 42. The lower mount lugs 32 and 34 and upper mount lugs 40 and 42 are attached to the forward terminal end of main frame 12 by any suitable means, as for example, bolting or welding. This enables the stabilizer apparatus 18, seen in FIG. 3, to be attached and removed from the main frame 12, by removing the hydraulic fluid connectors at 36' and 38' along with the pivot pins at lower mount lugs 32 and 34, and upper mount lugs 40 and 42.

The pressure control device 50 is adjusted at regulator 52 to provide pressure at connectors 36' and 38' from pump P and thereby maintain a constant predetermined pressure of the wheel 20 against the ground 16; which in turn enables a constant predetermined pressure of the digging implement 14 to be maintained against the ground 16 during the excavation process.

I claim:

1. A ground supported excavating machine having a main frame, said main frame has opposed ends; support and propelling means attached to said main frame for supporting and propelling the machine along the ground; means supporting a digging implement at one end of said main frame for excavating longitudinally of said main frame as the machine travels along the ground, and a stabilizer apparatus supported at the other end of said main frame in opposition to the digging implement;

said stabilizer apparatus includes a knuckle to which there is pivotally attached a yoke for pivoting about a vertical axis; a horizontally mounted wheel axle attached to the lower end of said yoke, a wheel rotatably supported in journaled relationship on said axle; said yoke and knuckle cooperate together to allow said wheel to caster as it makes rolling contact with the ground;

said stabilizer apparatus further includes elevator means to which said knuckle is attached; said stabilizer apparatus is attached for movement to said main frame for elevating and for lowering said knuckle and thereby place the wheel in rolling contact with the ground and thereby elevate the end of the frame to which the stabilizer apparatus is attached while selectively forcing said digging implement against the ground; and, means for controlling the force with which the elevator means elevates and lowers said knuckle respective to the frame.

2. The excavating machine of claim 1 wherein said elevator means includes a lifting cylinder by which the wheel, yoke, and knuckle is raised in response to hydraulic pressure effected within said lifting cylinder, a telescoping lifting member, a fixed support column within which said lifting member is housed for vertical reciprocating movement therewithin, connecting means by which said knuckle is affixed to said lifting member, said yoke is affixed to an upstanding shaft that is rotatably received by said knuckle for swiveling about a vertical axis;

whereby, said lifting cylinder moves said telescoping lifting member vertically within said support column and thereby elevates the end of the frame to which the stabilizer apparatus is attached.

3. The excavating machine of claim 2 wherein said support column includes a vertical window formed therein which opens toward said yoke, said connecting means includes a plate attachment member having opposed ends with one end thereof attached to said lifting member and the other end thereof attached to said knuckle, said plate attachment member has a medial part thereof extending through said window for vertical movement therewithin.

4. The excavating machine of claim 3 wherein the main frame is track mounted for propelling the machine longitudinally along the ground; and means applying a constant pressure to said hydraulic cylinder means to selectively move said digging implement against the ground with a constant force.

5. The excavating machine of claim 1 wherein said main frame is supported from a pair of ground supported tracks, and the digging implement is a ladder type trencher having a hydraulic cylinder means connected for elevating the digging implement;

said elevator means includes a support arm having journal means by which one end thereof is pivotally attached to said main frame with said knuckle being attached to the other end thereof; a hydraulically actuated cylinder assembly having a piston shaft extending therefrom; means by which one end of said hydraulically actuated cylinder assembly is journaled to a medial part of the arm and by which the other end thereof is journaled to the main frame at a location spaced from the journaled end of the arm.

6. The excavating machine of claim 1 wherein said elevator means includes a pivotal support structure having opposed ends with one end being journaled to said main frame by which said support structure is connected for low friction pivotal movement respective to said main frame; and hydraulic cylinder means connected to pivot said support structure to thereby force said wheel into rolling contact with the ground and move the end of the main frame vertically.

7. The excavating machine of claim 1 wherein the main frame is supported from a pair of ground supported tracks, and the digging implement is a ladder type apparatus that engages the ground with a constant force determined by the force exerted on the opposed end of the main frame by the stabilizer, and said elevator means includes a pivotal support structure having opposed ends with one end being journaled to said main frame by which said support structure is connected for low friction pivotal movement respective to said main frame; and hydraulic cylinder means connected to pivot said support structure to thereby force the opposed ends of the main frame to move vertically.

8. The excavating machine of claim 1 wherein the main frame is track mounted for propelling the machine longitudinally along the ground; and means applying a constant pressure to said hydraulic cylinder means to reduce oscillation of the main frame about the track while selectively moving said digging implement against the ground with a constant force;

a counterweight attached to said main frame; said stabilizer apparatus is attached to said counterweight.

9. An excavating machine having a main frame with opposed ends, means supporting and propelling said main frame along the ground; a digging implement; a mount means for supporting said digging implement from one end of said main frame; the improvement comprising:

a stabilizer means for reducing rocking motion of said main frame about said main frame support while said digging implement is forced into engagement with the ground with a selected magnitude of force; said stabilizer means includes a support structure affixed to the end of said main frame that is opposed to said digging implement; said stabilizer means includes an elevator means that is supported respective to said support structure;

a wheel, said elevator means having opposed ends with one end being journaled to said support structure and connected for low friction pivotal movement respective to said main frame and the other end thereof being connected to support said wheel; said elevator means includes hydraulic cylinder means connected to pivot said elevator means to thereby engage the ground with said wheel and force the end of the main frame to move vertically in one direction while the other end thereof moves vertically in the opposite direction;

whereby; the constant force with which the wheel makes rolling contact with the ground is selected and thereby elevate the end of the frame to which the stabilizer apparatus is attached while selectively forcing said digging implement against the ground with a selected constant force.

10. The excavating machine of claim 9 wherein said elevator means includes a yoke pivotally received by a knuckle, said wheel is mounted to said yoke, a lifting cylinder by which the wheel, yoke, and knuckle is raised in response to hydraulic pressure effected within said lifting cylinder, a lifting member, a fixed support column within which said lifting member is housed for vertical reciprocating movement therewithin, connecting means by which said knuckle is affixed to said lifting member, said yoke is affixed to an upstanding shaft that is rotatably received through said knuckle for swiveling about a vertical axis; whereby, said lifting cylinder moves said lifting member vertically within said support column and thereby elevates the end of the frame to which the stabilizer apparatus is attached.

11. The excavating machine of claim 10 wherein said support column includes a vertical window formed therein which opens toward said yoke, said connecting means includes a plate attachment member having opposed ends with one end thereof attached to said lifting member and the other end thereof attached to said knuckle, said plate attachment member has a medial part thereof extending through said window for vertical movement therewithin.

12. The excavating machine of claim 11 and further including means for propelling the machine longitudinally along the ground; and means applying a constant pressure to said hydraulic cylinder means to reduce rocking of the main frame about the track while selectively moving said digging implement against the ground with a constant force.

13. The excavating machine of claim 9 wherein said main frame is supported from a pair of ground supported tracks, and the digging implement is a ladder type trencher having a hydraulic cylinder connected for elevating the digging implement;

said elevator means includes a support arm having journal means by which one end thereof is pivotally attached to said main frame and with a knuckle being attached to the other end thereof; said knuckle rotatably supports a yoke to which said wheel is supported for castering when in rolling contact with the ground; said hydraulically actuated cylinder assembly having a piston shaft extending therefrom; means by which one end of said hydraulically actuated cylinder assembly is journaled to a medial part of the arm and by which the other end thereof is journaled to the main frame at a location spaced from the journaled end of the arm.

14. The excavating machine of claim 9 wherein said elevator means includes a pivotal support structure having opposed ends with one end being journaled to said main frame by which said support structure is connected for low friction pivotal movement respective to said main frame; and hydraulic cylinder means connected to pivot said support structure to thereby force said wheel into rolling contact with the ground and thereby move the opposed ends of the main frame vertically in opposite directions.

15. The excavating machine of claim 9 wherein the main frame is supported from a pair of ground supported tracks, and the digging implement is a ladder type apparatus that engages the ground with a constant force determined by the force exerted by the stabilizer, and the said elevator means includes a pivotal support structure having opposed ends with one end being journaled to said main frame by which said support structure is connected for low friction pivotal movement respective to said main frame; and hydraulic cylinder means connected to pivot said support structure to thereby force the ends of the main frame to move vertically.

16. The excavating machine of claim 15 wherein there is further included means for propelling the machine longitudinally along the ground; and means applying a constant pressure to said hydraulic cylinder means to selectively move said digging implement against the ground with a constant force.

17. An excavating machine having a main frame with opposed ends, said main frame is track mounted for propelling the machine longitudinally along the ground; a digging implement; a mount means for supporting said digging implement from one end of said main frame; a counterweight attached to the other end of said main frame; a stabilizer means attached to said counterweight for reducing rocking motion of said excavating machine; means for moving said counterweight longitudinally of said excavating machine;

a support structure by which said counterweight is affixed to said main frame; said stabilizer means includes an elevator means that is supported respective to said support structure; said elevator means includes a wheel, said elevator means having opposed ends with one end being journaled to said support structure and connected for low friction pivotal movement respective to said main frame and the other end thereof being connected to support said wheel; said elevator means includes hydraulic cylinder means connected to pivot said elevator means to thereby engage the ground with said wheel and force the end of the main frame to move vertically;

whereby; a constant force with which the wheel makes rolling contact with the ground can be selected and thereby elevate the end of the frame to which the stabilizer apparatus is attached while selectively forcing said digging implement against the ground with a selected constant force.

18. The excavating machine of claim 17 wherein said elevator means includes a yoke, said wheel is mounted to said yoke, said yoke is pivotally connected to a knuckle, a lifting cylinder by which the wheel, yoke, and knuckle is raised in response to hydraulic pressure effected within said lifting cylinder, a telescoping lifting member, a fixed support column within which said lifting member is housed for vertical reciprocating movement therewithin, connecting means by which said knuckle is affixed to said lifting member;

said yoke is affixed to an upstanding shaft that is rotatably received through said knuckle for swiveling about a vertical axis; whereby, said lifting cylinder moves vertically within said support column and thereby and thereby elevates the end of the frame to which the stabilizer apparatus is attached.

19. The excavating machine of claim 18 wherein said support column includes a vertical window formed therein which opens toward said yoke, said connecting means includes a plate attachment member having opposed ends with one end thereof attached to said lifting member and the other end thereof attached to said knuckle, said plate attachment member has a medial part thereof extending through said window for vertical movement therewithin.

20. The excavating machine of claim 17 wherein said digging implement is a ladder type trencher having a hydraulic cylinder connected for elevating the digging implement; said elevator means includes a support arm having journal means by which one end thereof is pivotally attached to said main frame and with a knuckle being attached to the other end thereof; said knuckle rotatably supports a yoke to which said wheel is supported for castering when in rolling contact with the ground; said hydraulically actuated cylinder assembly having a piston shaft extending therefrom; means by which one end of said hydraulically actuated cylinder assembly is journaled to a medial part of the arm and by which the other end thereof is journaled to the main frame at a location spaced from the journaled end of the arm.

* * * * *